Patented Jan. 20, 1942

2,270,490

UNITED STATES PATENT OFFICE 2,270,490

MORPHOLINE COMPOUND AND METHOD OF PREPARATION

William H. Wood, Bedford, Ohio, assignor to Harris-Seybold-Potter Company, Cleveland, Ohio, a corporation of Delaware No Drawing. Application April 29, 1939, Serial No. 270,922

13 Claims. (Cl. 260—247)

This invention relates to carbon compounds, and more particularly to morpholine compounds and their preparation. And, in accordance with the invention certain novel compounds may be had, which are capable of important usages in the fields of photographic developers, local anesthetics, anti-oxidants, etc.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

Morpholine is a transparent colorless compound, liquid at normal temperatures, ring form in character, and generally assigned the formula

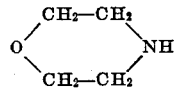

I have found that reacting morpholine with sulphur dioxide as set forth herein, yields compounds of peculiar characteristics and utilities. In the preparation of these, for instance sulphur dioxide is passed into a predetermined amount of morpholine until an amount of the sulphur dioxide equivalent to a certain amount, in terms of mols of the sulphur dioxide to the morpholine, is absorbed. The sulphur dioxide may be gaseous or liquid, conveniently the former, and in the absence of water. The reaction proceeds rapidly and is accompanied by the evolution of heat. To avoid excessive temperature-rise and the formation of by-products of somewhat resinous character, the temperature is preferably controlled to not exceed 120° C. The reaction may be carried out at relatively low temperatures for example below 60° C., it being important however that the morpholine be maintained in its liquid form. The reaction proceeds more slowly with decrease in temperature. With supply of the sulphur dioxide to the amount equivalent to one-half mol thereof to each mol of morpholine, under the conditions mentioned, the resulting reaction product is a clear colorless liquid at room temperatures, and quite stable. This compound shows analytically a composition corresponding to $(OC_4H_8NH)_2SO_2$. On now adding to this one-half mol of water for each mol of the original morpholine, a white solid crystalline compound quickly forms. Analysis of this shows a compound corresponding to $(OC_4H_8NH_2)_2SO_3$ or $(OC_4H_8NH)_2SO_3H_2$. This compound is very soluble in water, 40 per cent solutions being possible, and has a theoretical molecular weight of about 250 and has some characteristics normally identified with sulphites. Experimentally determined molecular weight is about 112.45 which is consistent with the fact that the compound is about 63.5 per cent ionized in water solution. Such compound may be referred to as morpholine sulphite. As to its detailed structure, while the matter has not yet been fully determined, there is some reason for believing that the following equations provide a satisfactory explanation for the reactions involved:

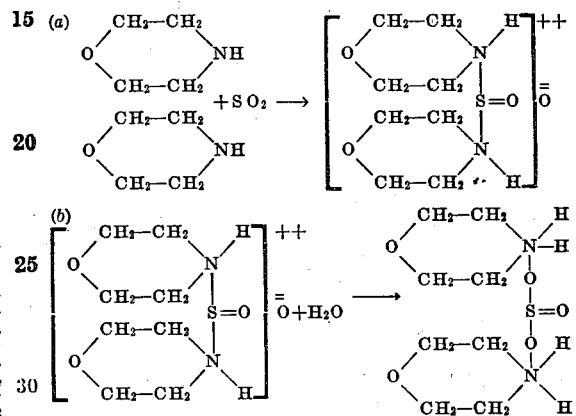

By continuing the reaction between morpholine and sulphur dioxide, under proper conditions, with combining of more sulphur dioxide in determined amount, there results a further compound of this invention, hereafter referred to as morpholine bisulphite, and for this as in the preparation of the above-sulphite, sulphur dioxide is passed into liquid morpholine, in the absence of water, until one-half mol of sulphur dioxide for each mol of morpholine is absorbed. As above pointed out, this reaction is carried out at a temperature below 120° C. but sufficiently high to maintain the morpholine in liquid form. More sulphur dioxide is now supplied and the reaction (a) continued until a further one-half mol of gas is absorbed, that is, until a total of one mol of sulphur dioxide to each mol of morpholine has been combined. In this latter stage of the reaction however, the temperature should be below about 60° C. in order to avoid formation of undesired by-products, and yet sufficiently high to maintain the morpholine in liquid form. The entire reaction may be carried out at a temperature below 60° C., from the beginning if desired, but absorption of the first one-half mol of sulphur dioxide will proceed more slowly, than if the temperature thereof is above 60° C. It is thus practically advantageous to divide the reaction into the two stages with appropriate temperature control, as indicated. In all cases the absorption or combination of the first one-half mol of sulphur dioxide proceeds more rapidly than the second one-half mol. The product of the reaction of one mol of sulphur dioxide with one mol of morpholine is a clear colorless liquid at reaction temperatures, which on cooling to room temperature becomes a white powder. Analysis indicates the composition of this product to be $OC_4H_8NHSO_2$. It is quite stable and may be used in this form or may be further molecularly combined with water as will now be detailed.

To this reaction product resulting from the absorption or combining of one mol of sulphur dioxide with each mol of morpholine, one mol of water is now added, and a white solid crystalline compound forms. This compound is extremely soluble in water, solution concentrations higher than 60 per cent being possible. Its molecular weight determination shows about 169, and it has some characteristics usually identified with a bisulphite. As with the sulphite above, there is some reason for believing that the reactions may be set forth in the following equations:

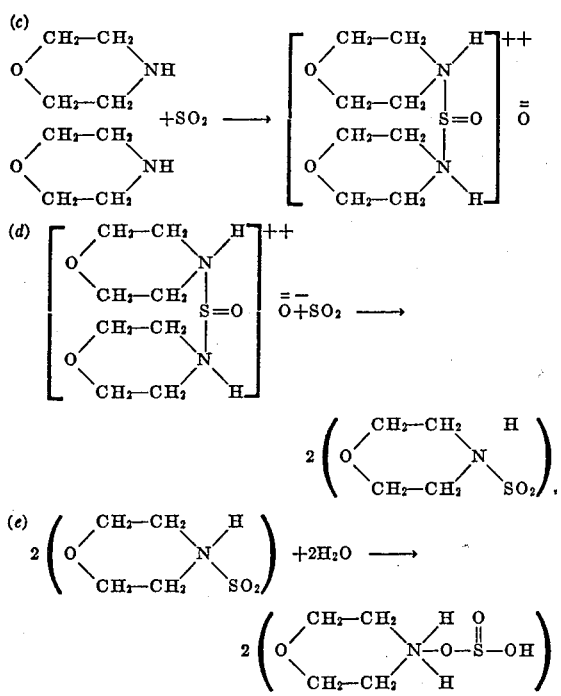

This compound, referred to as morpholine bisulphite, on account of its physical form and its extreme solubility in water is readily utilizable in various practical applications.

The compounds, whether the sulphite or bisulphite, may be further purified if desired, by washing with ether, or by dissolving in alcohol and re-crystallizing. The compounds in accordance with the invention, are seen to be of the general formula

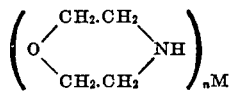

in which $n$ is 1 or 2 and M is $SO_2$ or $SO_3H_2$. Depending upon the particular usage, the various members as indicated may be employed, or mixtures thereof.

Other modes of applying the principle of the invention may be employed, change being made as regards the details described, provided the features stated in any of the following claims, or the equivalent of such, be employed.

I therefore particularly point out and distinctly claim as my invention:

1. A process of making a morpholine derivative, which comprises reacting morpholine with sulphur dioxide, in the absence of water, while controlling the temperature to below 120° C., until one-half mol of sulphur dioxide is absorbed for each mol of morpholine, then reacting further one-half mol of $SO_2$, in the absence of water, while controlling the temperature to below about 60° C., until another half mol of sulphur dioxide is absorbed for each mol of morpholine, and finally incorporating one mol of water with each mol of such product, to the formation of a crystalline material.

2. A process of making a morpholine derivative, which comprises reacting morpholine with sulphur dioxide, in the absence of water, while controlling the temperature to below 120° C., until one-half mol of sulphur dioxide is absorbed for each mol of morpholine, and then reacting further one-half mol of $SO_2$, in the absence of water, while controlling the temperature to below about 60° C., until another half mol of sulphur dioxide is absorbed for each mol of morpholine.

3. A process of making a morpholine derivative, which comprises reacting morpholine with sulphur dioxide, in the absence of water, while controlling the temperature to below 120° C., until one-half mol of sulphur dioxide is absorbed for each mol of morpholine, and finally incorporating one-half mol of water with this product.

4. A process of making a morpholine derivative, which comprises forming a substance having anti-oxidant properties by reacting morpholine with sulphur dioxide, in the absence of water, while controlling the temperature to below 120° C., until one-half mol of sulphur dioxide is absorbed for each mol of morpholine.

5. A process of making a morpholine derivative, which comprises reacting morpholine with sulphur dioxide, in the absence of water, while controlling the temperature to below 120° C., until at least one-half mol of sulphur dioxide is absorbed for each mol of morpholine, and finally incorporating at least one-half mol of water with this product.

6. A process of making a morpholine derivative, which comprises forming a substance having anti-oxidant properties by reacting morpholine with sulphur dioxide, in the absence of water, while controlling the temperature to below 120° C., until at least one-half mol of sulphur dioxide is absorbed for each mol of morpholine.

7. A morpholine compound, corresponding to the formula

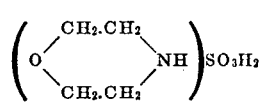

8. A morpholine compound, corresponding to the formula

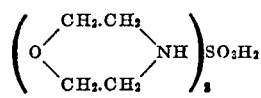

9. A morpholine compound, corresponding to the formula

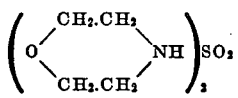

10. A morpholine compound corresponding to the general formula

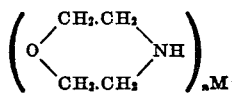

in which $n$ is a positive integer less than 3, and M is a member of the group consisting of $SO_2$ and $SO_3H_2$.

11. A morpholine compound consisting of morpholine combined with one-half mol of sulphur dioxide per mol of morpholine.

12. A morpholine compound consisting of morpholine having sulphur dioxide combined in proportion of not less than one-half mol and not more than one mol per mol of morpholine.

13. A morpholine compound according to claim 12 in which water is also combined.

WILLIAM H. WOOD.